THREE STAGE SWITCHING MATRIX

Filed Feb. 26, 1968 5 Sheets-Sheet 1

INVENTOR.
RONALD BEEBE
BY
Hopgood & Calimafde
ATTORNEYS

Sept. 29, 1970 R. BEEBE 3,531,773

THREE STAGE SWITCHING MATRIX

Filed Feb. 26, 1968 5 Sheets-Sheet 2

INVENTOR.
RONALD BEEBE

BY

Hopgood & Calimafde
ATTORNEYS

INVENTOR.
RONALD BEEBE
BY
Hopgood & Calimafde
ATTORNEYS

INVENTOR.
RONALD BEEBE
BY
Hopgood & Calimafde
ATTORNEYS

INVENTOR.
RONALD BEEBE
BY
Hopgood & Calimafde
ATTORNEYS

United States Patent Office 3,531,773
Patented Sept. 29, 1970

3,531,773
THREE STAGE SWITCHING MATRIX
Ronald Beebe, St. Petersburg, Fla., assignor to Electronic Communications, Inc.
Filed Feb. 26, 1968, Ser. No. 708,216
Int. Cl. H04q 9/00, 3/00
U.S. Cl. 340—166 7 Claims

ABSTRACT OF THE DISCLOSURE

A three stage non-blocking switching array includes two terminating matrices each arranged in groups and having silicon controlled rectifiers at the individual cross-over points. A center stage matrix group, including two terminal negative resistance elements at the crossover points, serves to couple the terminating matrices. The switching array is double end-fired with a path being chosen by the breakover potential of the center stage elements. By marking one of the terminating stages with a ramp voltage the chance of cross-firing, that is, the selection of a number of paths simultaneously is reduced considerably.

BACKGROUND OF THE INVENTION

Arrangements for inter-coupling two of a plurality of lines which either initiate at separate locations or serve distinct functions are well known to the art. In the most basic conventional arrangement, the lines or wires in each group are led orthogonally to one another with a cross-over element coupling all the possible combinations in a tic-tac-toe pattern. To establish a connection between any line in one orthogonal direction and a line in the other, a particular cross-coupling element is placed in the conductive state.

While this arrangement is simple, it is neither economical nor reliable. It is not economical because a one hundred to one hundred coupling array of this type would require at least 10,000 active elements plus their attendant control circuitry. It is not reliable because the loss of a single element negatives the ability of the array to effectively couple the two lines services by by that element.

Improvements in swtiching array have increased reliabiltiy and reduced the number of elements. These improvement, however, have at the same time increased the possibility of cross-firing and multi-pathing (where more than one path is furnished by the control circuitry in response to a request). This problem, of course, is non-existent with the first discussed array.

Objects of the invention

Accordingly, it is the object of this invention to provide a simple and economical switching array with a practical number of elements which ameliorates cross-firing and multi-path problems.

It is a further object of the invention to provide a switching array which is of the non-blocking type, i.e., which is not generally susceptible to path loss due to the shorting or opening of elements in the system.

It is a further object of this invention to provide a switching array which is sufficiently flexible in terms of line assignments so that it may adapt to traffic flow and equipment reliability considerations for the particular system for which it is designed.

Summary of the invention

Briefly, the invention is predicated upon a three-stage switching array fired at both ends. The rear end terminating matrix has Z output lines; and Y input lines coupled in common to each of the Z output lines. The input and output lines of the rear end terminating matrix are coupled through silicon controlled rectifiers (SCR's), the unused ones of which are marked with a predetermined potential when a particular line is desired. A plurality of front end terminating matrices have X input lines; and Y output lines (similar in number to the rear end inputs) also coupled in common to respective input lines through silicon controlled rectifiers. As with the output matrices, unused SCR's coupled to the desired input line at the front end are marked with a predetermined second potential. Preferably, the second potential is in ramp voltage form. The center matrices each include input lines for the rear end terminating matrices and output lines for the front end terminating matrices coupled orthogonally through two terminal negative resistance devices which breakover when the difference between the first and second marking potentials exceeds the critical voltage of the two terminal device. The selected path is arbitrary and is selected by the first breakover which further acts to insure that no second path is initiated.

The above mentioned and other features and objects of this invention and the manner of attaining them will become more apparent and the invention itself will best be understood by reference to the following description of an embodiment of the invention taken in conjunction with the accompanying drawings, the description of which follows.

Detailed description of the invention

Figure 1:
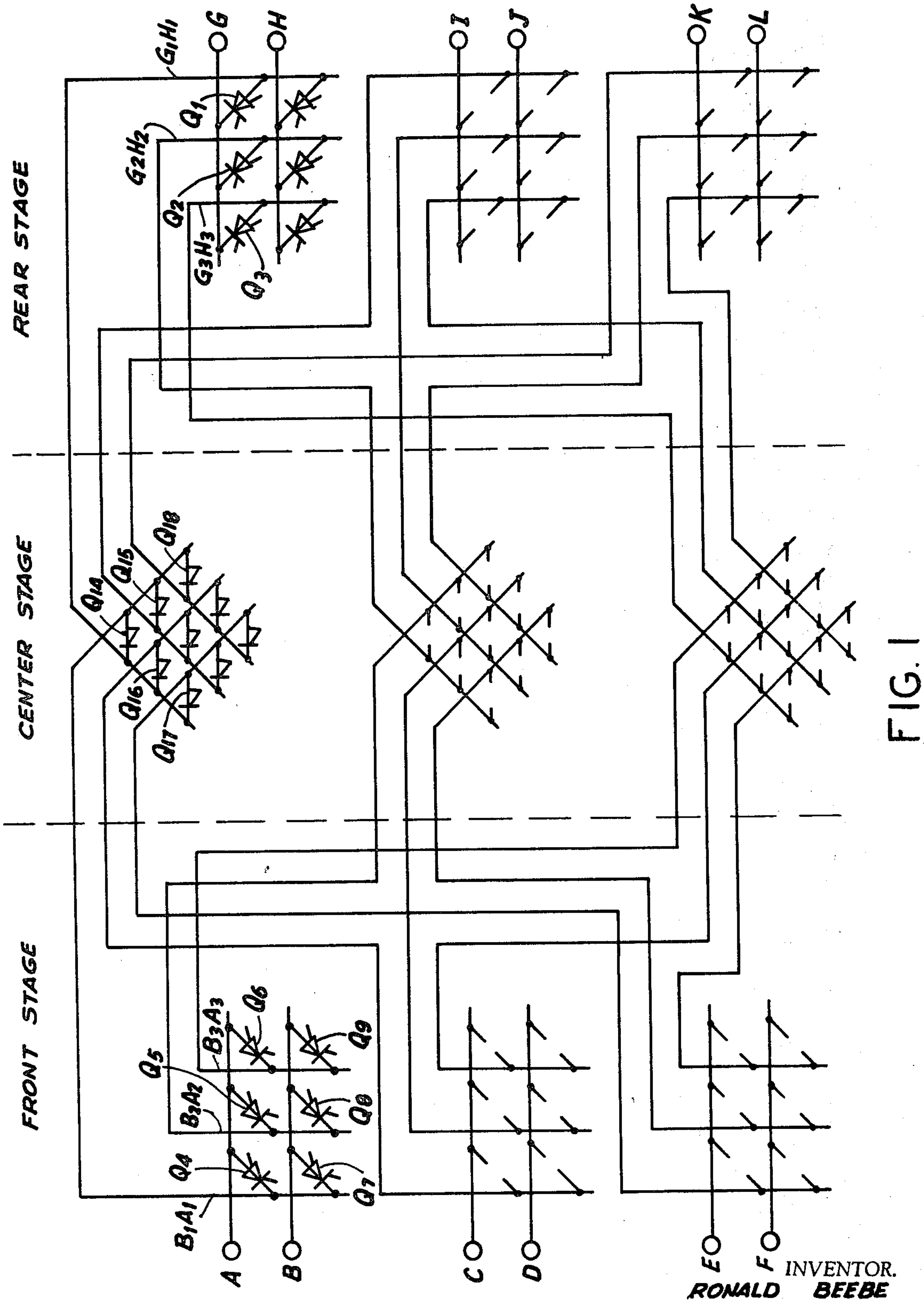
FIG. 1 is a schematic illustration of a typical three-stage six by six non-blocking switching array according to the invention.

Turning now to the invention, and in particular to FIG. 1, the matrix according to the invention is shown schematically. While diodes have been shown in the upper sections of each of the front, center, and rear stages in this figure, it will be appreciated this is for the purpose of simplicity and that each stage is redundant from top to bottom in the drawings. Also for simplicity, the front and rear stages are shown only schematically. Each of the latter two stages also includes additional circuitry, however, for the purposes of general description in connection with this figure, the showing of the coupling elements alone is sufficient.

The front and rear stages employ silicon controlled rectifiers (SCR's) as cross point switches while the center stage utilizes a negative resistance element such as a silicon unilateral switch (hereinafter SUS).

The SCR's employed are the type having two control gates: an anode gate and a cathode gate. A negative potential applied to the anode gate with respect to the anode will fire the device and a positive potential applied to the cathode gate with respect to the cathode will also cause conduction. In the description which follows, it will be appreciated that in the described embodiment, two gates are used in a rear stage while only the cathode gate is used in the front stage.

SUS's are turned on by applying a "breakdown potential" across them from anode to cathode. The anode must be positive with respect to the cathode. Both devices, SCR's and SUS's, may be turned off either by reversing the potential across them, by applying a negative voltage to the anode with respect to the cathode, or by interrupting the current through the device by opening a switch in series with it.

While the arrangement shown in FIG. 1 is symmetrical about the center stage, this is not the case with respect to the driving circuitry (shown in FIGS. 2 and 4), nor is it a functional requisite of the line grouping.

Thus, for example, with respect to the line grouping, the first stage might have a first group of three input lines, that is, A, B and C, a second group of three input lines D, E, and F. The rear stage, on the other hand, may maintain the configuration of three groups of two lines each as shown. In this case, the center stage would be orthogonally unsymmetrical and would include two lines to the front stage and three lines to the rear stage. Consequently, there would be six crossovers rather than nine in each center stage. There would also be a corresponding reduction in the ability of the circuitry to perform, since if lines A and B were busy, thereby using up the first two vertical lines ($B_1A_1$, $B_2A_2$) line C would of necessity be forced to the third line in order to communicate with the rear stage matrix. In this case, should the SCR associated with this line be defective or out of commission, line C could not communicate until either line A or B had ceased communicating.

In order to avoid this condition, a fourth common output line could be added to the front stage groups and a fourth common input line added to the rear stage groups giving an alternate route possibility where two lines were busy in any one group. A fourth center stage would then be provided to accommodate these new lines.

In sum, then, whether the front and rear stages are symmetrical about the center, whether the center stage is a square, and the number of center stages required, are all design considerations, whose criteria are dictated by the number of alternate routes desired as well as the traffic pattern at the front and rear stages. This criteria will also dictate the number of elements required by the system.

Thus, in the six by six non-symmetrical system described, a center stage would have only two thirds (6 as opposed to 9) the number of crossover elements. It would also have fewer alt-routes.

For purposes of comparison with the simplest type array where there is a single crossover for each possible set of lines, such an array for 100 x 100 system would require, as mentioned, 10,000 elements. The system according to the invention, however, if symmetrical and based upon 33 front and rear stage groups of three lines each, and each having five couplings to the center stage would include five center stages of approximately 1,000 elements each (5,000 elements) plus front and rear stages each including 15 x 33 elements (approximately 1,000 elements) giving 6,000 elements in all. In other words, less elements and more reliability than the described simple system.

Describing the system at first generally: in establishing a connection, the rear stage will be marked first on the desired line, for example on line G, thereby triggering SCR's $Q_1$, $Q_2$ and $Q_3$ into conduction and placing a predetermined potential upon the cathodes of SUS's $Q_{14}$, $Q_{16}$, and $Q_{17}$ of the first center stage as well as the corresponding SUS's in the second and third center stage.

If the line to be connected to G is A, then SCR's $Q_4$, $Q_5$, and $Q_6$ would likewise be marked, placing potentials on lines $B_1A_1$, $B_2A_2$, and $B_3A_3$. Accordingly, SUS $Q_{14}$, would be doubly marked in the first stage, and similarly located SUS's in the second and third stages would also be marked.

In a manner to be described, breakover potential would be achieved and at random, one of these SUS's would fire first. The firing of the first SUS would reduce potentials in the circuitry and obviate any further firing. This is preferably accomplished by a ramp voltage firing which provides sufficient response time for the foregoing to be effectuated.

Figure 2:
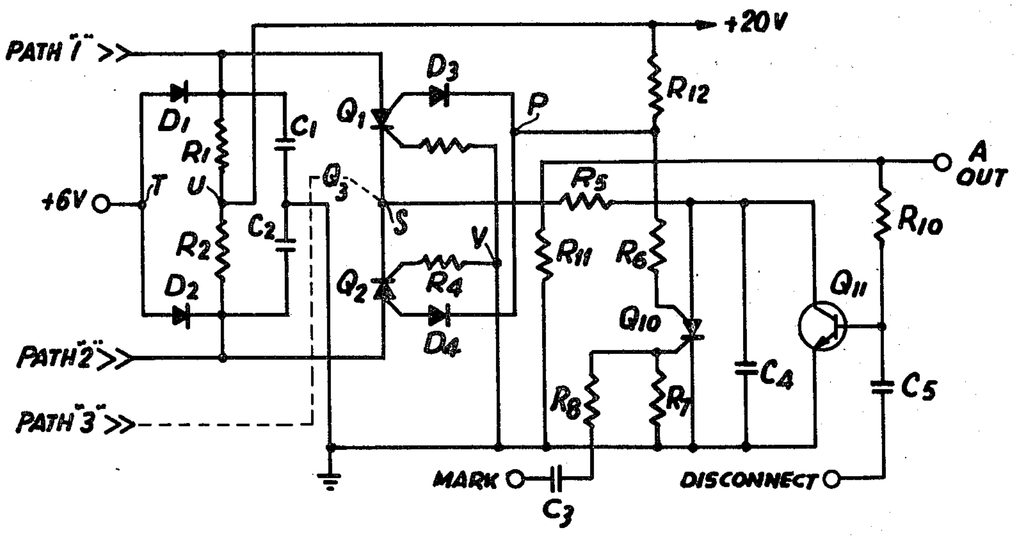
FIG. 2 illustrates a terminating or rear end matrix stage according to the invention.

FIG. 2 illustrates a portion of the upper rear stage matrix. For reasons of simplicity, only SCR's $Q_1$ and $Q_2$ are shown coupled in circuit. SCR $Q_3$ would of course be similarly coupled at points P, S, V, U and T through elements corresponding to those coupling elements $Q_1$ and $Q_2$ to those points.

The sequence for obtaining a path through the array involves first the turning on of all available possible paths in the last stage which connect to the desired line. Subsequently, all the available possible paths are then fired from the originating point or front stage. This should as mentioned produce several paths through the matrix but when the firing potential returns to the holding level, only one path will be self-held because of the inherent regenerative nature of the devices involved.

To turn on the last stage available paths, a positive going pulse is applied to the "MARK" input. This pulse triggers SCR $Q_{10}$ (not directly associated in the matrix) to the "on" stage and allows anode gate current to flow from 20 volt supply through $R_6$ and $R_{12}$ into the anode gate. The potential at the junction of these two resistors will drop to approximately 10 volts allowing current to flow from capacitors $C_1$ and $C_2$ (previously charged to 20 volts) through the anodes of matrix SCR's $Q_1$ and $Q_2$, into the anode gates to the junction of the two resistors $R_6$ and $R_{12}$. In a static state, both the anode and anode gates are at the same potential. Consequently, no current flows until the marked pulse appears. Current flow from anode to anode gate is a "turn on" condition for matrix SCR's $Q_1$ and $Q_2$.

After turn-on occurs, holding current is supplied from the 6 volt source through diodes $D_1$ and $D_2$ into the anodes of SCR's $Q_1$ and $Q_2$. The potential on the cathodes of SCR's $Q_1$ and $Q_2$ changes from 0 volts in the "off" state to 4.5 volts in the "on" state. This rise in potential supplies current into the base of transistor $Q_{11}$ through resistor $R_{10}$, saturating the device and pulling its collector and the anode of SCR $Q_{10}$ to approximately .2 volt above ground. Where this occurs, SCR $Q_{10}$ turns off and holding current flows through saturated transistor $Q_{11}$.

This holding condition will remain until the originating or front end is fired (to be described). After the originating end of the matrix is fired and a path is established, holding current is supplied from a talk amplifier (not shown) at a higher potential than the 6 volt supply. Holding current is approximately 7.5 volts at the anode of the path SCR. Except for the lowest impedance path resulting from the firing of the first center stage SUS, all remaining rear stage SCR's previously marked would turn off.

The situation may also exist where one of SCR's $Q_1$ through $Q_3$ is in use due to one of the associated paths being in the talking condition. Thus, for example, path H may already be coupled through SCR $Q_1$. If we assume this to be the fact, the potential on the anode of transistor $Q_1$ will be 7.5 volts instead of 20. Now, if a marked pulse is applied to SCR $Q_{10}$ as previously described, the potential at the junction of the one of the resistors $R_6$ and $R_{12}$ drops to 10 volts, and anode to anode gate current will flow only through SCR $Q_2$; $Q_1$ anode to anode gate is back biased and will not turn on. Similarly, SCR $Q_3$ (shown only in phantom) will also turn on. This back biasing arrangement makes it relatively impossible to turn on any device which would produce a cross firing condition.

To turn the terminating matrix off either in standby or the fired condition is simple. A negative pulse is applied to the base of transistor $Q_{11}$. Since this is the only high current path for the matrix, the matrix SCR's turn off, dropping off the path.

Figure 5:
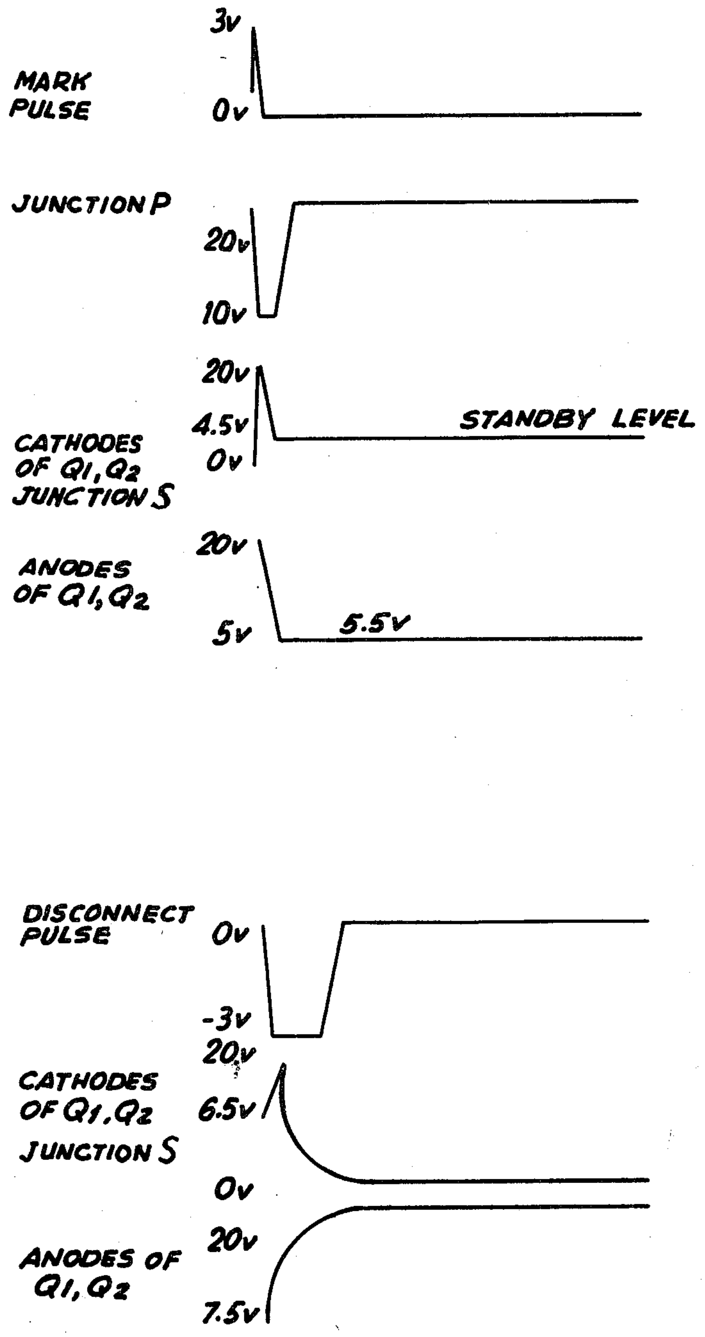
FIGS. 5 and 6 show wave forms at illustrative points in the network matrices of the invention.

FIG. 5 illustrates waveforms at specifically designated points in a terminating network. The upper and lower portions of FIG. 5 refer respectively to mark and disconnect pulses. As may be seen from this figure, marked anodes assume 5.5 volts potential.

Figure 3:
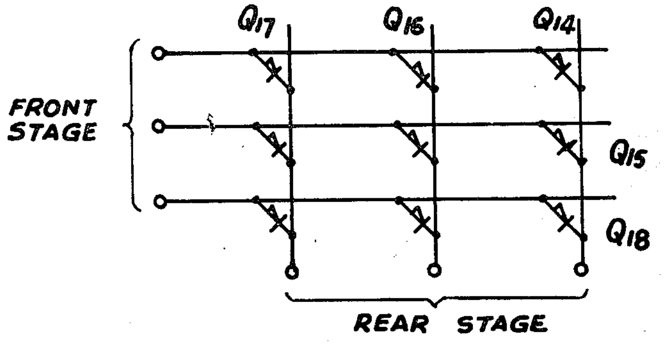
FIG. 3 illustrates a center matrix stage according to the invention.

The center stage of the matrix consists entirely of negative resistance elements, in this case, SUS's as shown in FIG. 3. The vertical lines coupling for example SUS's $Q_{14}$, $Q_{15}$, and $Q_{18}$ in common are the inputs to the rear stage; the horizontal lines, one of which couples for example, SUS's $Q_{17}$, $Q_{16}$ and $Q_{14}$ in common, are the outputs from the front stages. In a static condition, all of the unused outputs will be at 20 volts. As mentioned, if one of the terminating networks is marked, all unused inputs to it will drop to 5.5 volts.

As will be described with respect to the front stages, all of the unused outputs will be at zero volts in the static state. When the originating point in the front stage matrix is fired, a ramp wave form will be fed to the anode of any of the devices which lie in the possible matrix path. The ramp potential is approximately 8 volts above standby on the cathodes of the devices. This potential will cause the devices to switch to the conducting state. As mentioned, the cathode of the diode in use at the terminating or rear stage will rise to 7.5 volts and its anode will be approximately 8.5 volts. An unused diode unmarked is at 20 volts potential. Accordingly, the only path that can be made through the matrix is to a marked potential of 5.5 volts.

The actual breakover voltage of an SUS diode is 8.2 volts plus or minus 5% (or from 7.8 to 8.6 volts). This places the requirement upon the ramp voltage in the front stage that it rise to at least 8.6 volts above marked potential (5.5 plus 8.6=14.1) so that every associated diode can be fired.

The safety factor to prevent cross firing is determined by considering the minimum firing potential of the diodes and the in-use potential of the cathodes (7.8 plus 7.5=15.3 volts). The difference between the ramp firing potential and the required potential to cause cross firing is therefore 15.3 minus 14.1 or 1.2 volts (with the parameters listed as illustrative at the end of this specification).

Figure 4:
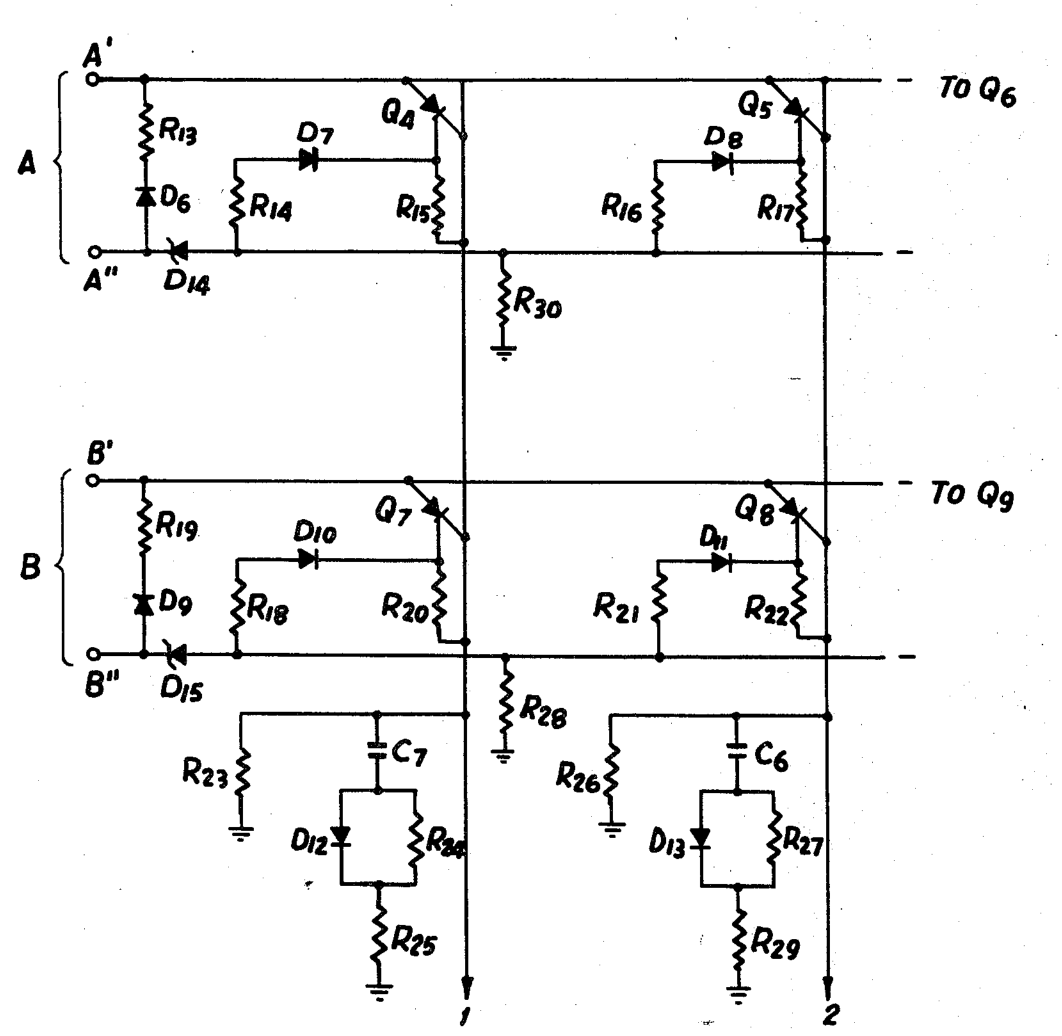
FIG. 4 shows front end terminating matrix stage according to the invention.

The first stage matrix group is shown in FIG. 4. In this figure, for purposes of clarity, each line is shown with both leads. The A line lead is designated A' and A'' and the B line B' and B''. Again, for purposes of simplicity, the third SCR line is omitted from each stage, thus $Q_6$ and $Q_9$ are not shown.

Figure 6:
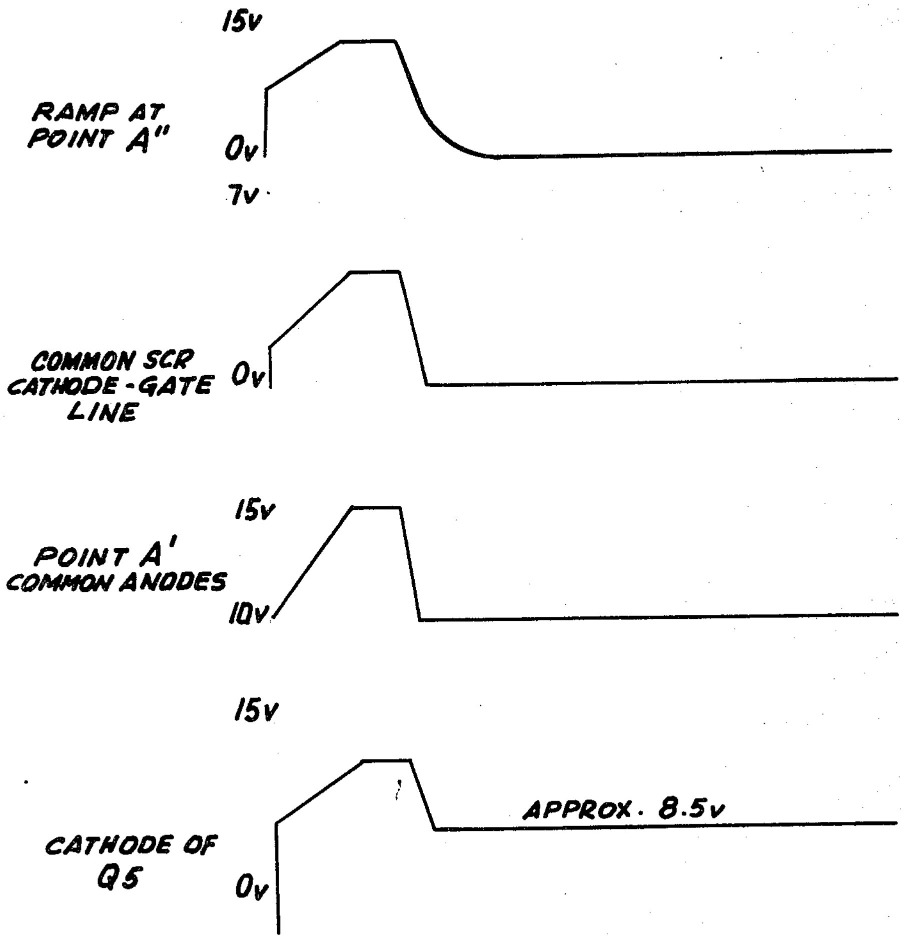

The anodes of SCR's $Q_4$, $Q_5$, $Q_7$ and $Q_8$ (and $Q_6$ and $Q_9$) are at 9.5 volts potential in the unmarked state. For marking, a ramp generator is coupled through gates (not shown) to A'' and B''. When the gate associated with the particular line to be fired, for example, the A line, is turned on, the ramp generator produces a 200 msec. rise time ramp wave form such as shown in FIG. 6. After the waveform passes through the appropriate gate, (either to A'' or B''), the gate turns off. When the appearance of the ramp firing voltage unused SCR's (in this case, $Q_4$ through $Q_6$) raise to 15.1 volts for the duration of the firing pulse.

Audio amplifiers (not shown) are D.C. coupled through diodes to A'' and B''. These are preferably feedback type amplifiers with stiff D.C. regulation so that when they are supplying current through the matrix, their output changes less than 0.5 volt D.C. The nominal output D.C. voltage is 10 volts.

Assume that the second line coupling SCR's $Q_5$ and $Q_8$ is in use and the A line is about to complete the firing sequence to produce a matrix path. When the ramp shown in FIG. 6 exceeds the rating of Zener diode $D_{14}$ (8.2 volts) the common SCR cathode gate line rises to approximately 7 volts. The cathode of SCR $Q_5$ (which is in the used state) exhibits 8.5 volts potential. It is therefore impossible to turn this SCR on. The cathodes of SCR $Q_4$ (and of course, $Q_6$) is at zero volts D.C. and therefore the 7 volts on its gate will turn it on.

After SCR $Q_4$ turns on, its cathode potential will rise rapidly to 10 volts and will then rise to 15.1 volts at a 200 msec. rise time rate. This occurs because the ramp wave form appearing at A'' is also coupled to the common anode line diode $D_6$ and then to $Q_4$'s cathode when it turns on. This is the ramp wave form which also turns on the center matrix SUS's.

An advantage of using SCR's in the front and rear stages of the matrix are that they are (1) turned on by their gates and (2) turned on only if the associated lines are not in use. This prevents any possible cross firing condition.

Another advantage of using SCR's instead of SUS's in the front stage matrix is the elimination of cross firing. The ramp firing generator turns on only one SUS instead of two in series. The ramp voltage itself permits a controlled firing through the center stage. This permits the fired stage to reduce in value sufficiently quickly to prevent other center stage SUS's from firing, and producing a multipath. SCR's in the first stage also avoid the possibility of two SUS's in series which, because a sharp transient is generated when one fires, tends to fire the other accidentally. For example, if the first stage consisted of SUS's they wouldn't turn on until the potential across them exceeded 8.2 volts. When they did turn, the potential would drop to approximately 1 volt at a 200 nano-second rate. This rapid rise time pulse is applied to the unfired center stage SUS which would tend to fire them all at a lower level because of rate effect. This could result in cross firing which, as previously mentioned, is not experienced when an SCR primary stage is employed.

It will be appreciated by those versed in the art that the additional resistors and capacitors shown but not particularly described are introduced into the circuitry to provide proper junction voltages and introduce necessary time constants. Zener and more conventional diodes are also introduced to isolate series circuits and protect junctions.

For the purposes of illustration, typical circuit parameters are listed below:

RESISTORS:

| | Ohms |
|---|---|
| $R_1$, $R_2$ | 150K |
| $R_3$, $R_4$ | 10K |
| $R_5$ | 330K |
| $R_6$, $R_{12}$ | 1K |
| $R_7$, $R_8$ | 560K |
| $R_{10}$ | 47K |
| $R_{11}$ | 56K |
| $R_{13}$, $R_{19}$ | 22K |
| $R_{14}$, $R_{16}$, $R_{18}$, $R_{21}$ | 1.5K |
| $R_{15}$, $R_{17}$, $R_{20}$, $R_{22}$ | 560K |
| $R_{23}$, $R_{26}$ | 150K |
| $R_{24}$, $R_{27}$ | 22K |
| $R_{25}$, $R_{29}$ | 470K |
| $R_{28}$, $R_{30}$ | 1.5K |

CAPACITORS:

| | µf. |
|---|---|
| $C_1$, $C_2$, $C_3$ | .01 |
| $C_4$, $C_5$, $C_6$, $C_7$ | .1 |

DIODES $D_1$, $D_2$, $D_3$, $D_4$, $D_6$,
$D_7$, $D_8$, $D_9$, $D_{11}$, $D_{12}$,
$D_{13}$—IN 914.
$D_{14}$, $D_{15}$—Zener 8.2 volts.

TRANSISTORS $Q_{11}$—2N3904.

SCR's $Q_1$, $Q_2$, $Q_3$, $Q_4$, $Q_5$,
$Q_6$, $Q_7$, $Q_8$, $Q_9$, $Q_{10}$—3N84's.

SUS's $Q_{14}$, $Q_{15}$, $Q_{16}$, $Q_{17}$,
$Q_{18}$, etc.—2N985.

While the principles of the invention have been described in connection with specific apparatus, it is to be clearly understood that this description is made only by way of example and not as a limitation to the scope of the invention as set forth in the objects thereof and in the accompanying claims.

What is claimed is:

1. A three-stage switching array comprising:

(a) M rear end terminating matrices each having Z output lines; Y input lines coupled in common to said Z output lines; each said inputs and outputs being coupled through a distinct silicon controlled rectifier; and means for triggering and marking all unused silicon controlled rectifiers coupled to an output line with a predetermined first potential;

(b) N front end terminating matrices each having X input lines; Y output lines coupled in common to each of said X input lines; each said input and output lines being coupled through a distinct silicon ocntrolled rectifier; and means for triggering and marking all unused silicon controlled rectifiers coupled to an input line with a predetermined second potential;

(c) Y center matrices each including an input line from each of said rear end terminating matrices arranged parallel a first coordinate and an output line from each of said fiont end terminating matrices arranged parallel an orthogonal coordinate; and (d) two terminal negative resistance elements coupling said input and output lines at respective crossover points in said center matrices, said two terminal negative resistance elements having a breakover voltage equal to the difference between said predetermined potentials.

2. The three stage switching array claimed in claim 1 wherein M and N are equal and the center stage matrix is orthogonally symmetrical.

3. The three stage switching array claimed in claim 1 where the two terminal negative resistance elements are silicon unilateral switches.

4. The three stage switching array claimed in claim 1 wherein one of said first and second predetermined potentials is a ramp voltage.

5. The three stage switching array claimed in claim 1 where a means for triggering all unused silicon controlled rectifiers in one of said front end and rear end terminating matrices comprises means for coupling a ramp voltage of rapid rise time to corresponding gate electrodes of said unused silicon controlled rectifiers.

6. The three stage switching array claimed in claim 5 where said coupling means includes Zener diodes respectively coupled to said gate electrodes.

7. The three stage switching array claimed in claim 4 where said ramp voltage is said second potential and wherein the silicon controlled rectifiers in said rear end matrices are four terminal devices, one of said control electrodes being employed as a mark input and the other of said control electrodes being employed as a disconnect input.

References Cited

UNITED STATES PATENTS

| | | | |
|---|---|---|---|
| 3,201,520 | 8/1965 | Bereznak | 340—166 XR |
| 3,223,978 | 12/1965 | Johnson | 340—166 |
| 3,349,186 | 10/1967 | Bereznak | 340—166 XR |

DONALD J. YUSKO, Primary Examiner

U.S. Cl. X.R.

179—18